United States Patent [19]

Agrawal et al.

[11] Patent Number: 4,571,736

[45] Date of Patent: Feb. 18, 1986

[54] DIGITAL COMMUNICATION SYSTEM EMPLOYING DIFFERENTIAL CODING AND SAMPLE ROBBING

[75] Inventors: Jagannath P. Agrawal, Lafayette, La.; Subramaniam S. Iyer, Sunnyvale, Calif.

[73] Assignee: University of Southwestern Louisiana, Lafayette, La.

[21] Appl. No.: 547,410

[22] Filed: Oct. 31, 1983

[51] Int. Cl.[4] .......................................... H04L 25/16
[52] U.S. Cl. ........................................ 375/27; 375/34
[58] Field of Search ................... 375/27, 34; 358/135, 358/13, 14; 371/43; 381/31

[56] References Cited

U.S. PATENT DOCUMENTS

| | | | |
|---|---|---|---|
| 4,292,651 | 9/1981 | Kretz et al. | 375/27 |
| 4,375,013 | 2/1983 | Cointot et al. | 375/27 |
| 4,468,708 | 8/1984 | Coleman, Jr. | 358/135 |
| 4,475,213 | 10/1984 | Medaugh | 375/27 |

OTHER PUBLICATIONS

"Partial Removal of Transmission Errors in Digitally Encoded Speech", by R. Steele, Electronics +Power, (Jun. 1978).
J. D. Gibson, "Adaptive Prediction in Speech Differential Encoding Systems, " Proceedings of the IEEE, vol. 68, No. 4, (Apr. 1980).
J. L. Flanagan et al., "Speech Coding," IEEE Transactions on Communications, vol. COM-27, No. 4, (Apr. 1979).
S. J. Campanella, "Digital Interpolation Techniques," Proceedings of the 1978 IEEE National Telecommunications Conference, pp. 14.1.1–14.1.5, Dec. 1978.
N. S. Jayant, "Subsampling of a DPCM Speech Channel to Provide Two Self-Contained Half Rate Channels," Bell Systems Technical Journal, 69[4], pp. 501–509, (Apr. 1981).

Primary Examiner—Benedict V. Safourek
Assistant Examiner—Kenneth I. Rokoff
Attorney, Agent, or Firm—Fleit, Jacobson, Cohn & Price

[57] ABSTRACT

Speech bit rate reduction by robbing, e.g. periodically not transmitting, a percentage of speech data samples in a communication system employing differential pulse code modulation (DPCM) or adaptive differential pulse code modulation (ADPCM). To overcome feedback interference introduced in the code by sample robbing, a robbed sample is replaced by its estimate so that the coding process continues in a normal manner. The estimate is established on the basis of autocorrelation statistics of the speech data samples. At the receiving end of the communication system, the robbed sample is estimated by the same process and re-estimated again using delayed interpolation after one period of delay. The technique is particularly useful where graceful degradation is desired under heavy traffic loading on the data channel, and is found most beneficial when the bit rate is about 24kb/s or lower where a relatively larger quantizing noise masks the interpolation noise introduced by sample robbing. The technique also facilitates handling speech packet loss in packet-networks. The signal-to-noise ratio was improved up to 3 db using a DPCM coder and 1.5 db using an ADPCM coder.

22 Claims, 8 Drawing Figures

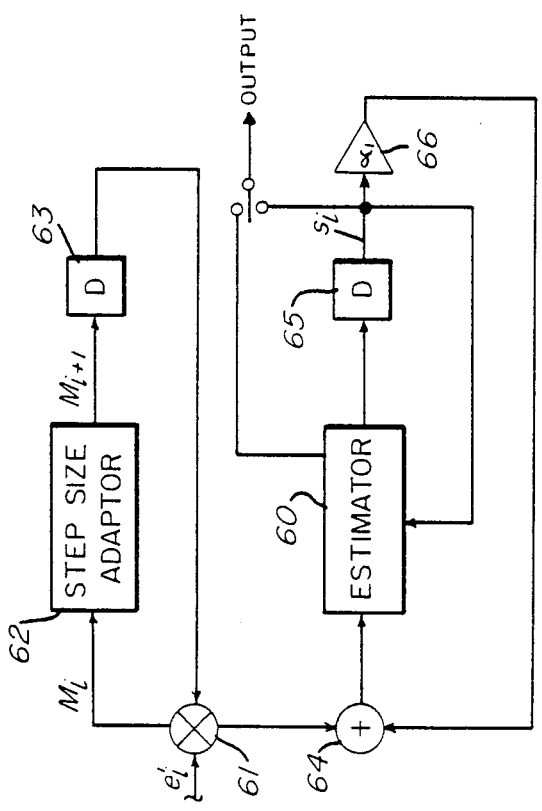
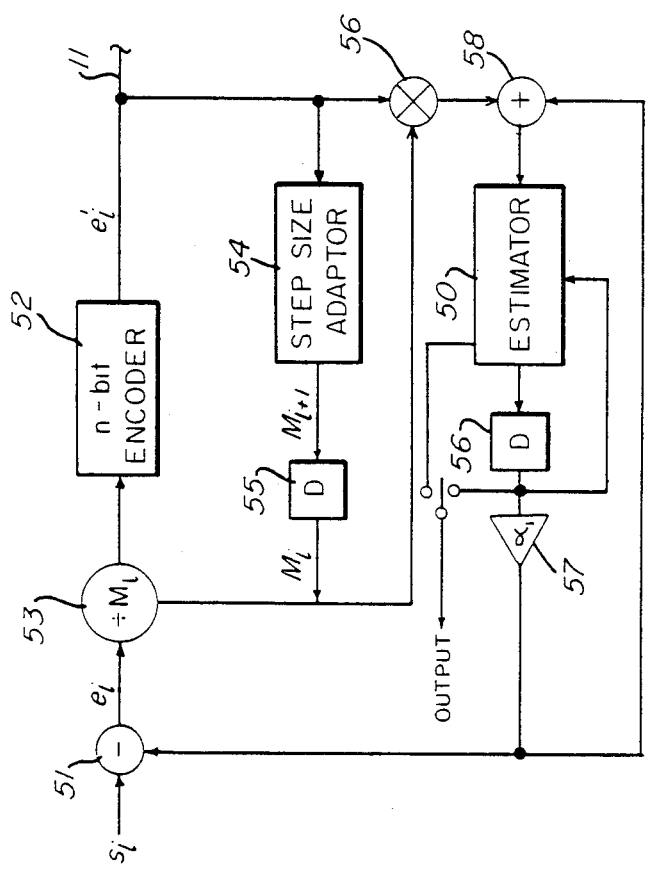
FIG. 2B
FIG. 2A

DIGITAL COMMUNICATION SYSTEM EMPLOYING DIFFERENTIAL CODING AND SAMPLE ROBBING

BACKGROUND OF THE INVENTION

This invention relates to digital communication systems, but more specifically to a class of coders used in such systems known as differential coders employing prediction coding techniques for increasing the effective rate of transfer of digital data and/or improving the signal-to-noise ratio in the communication system.

In a communication system, it is often desirable to compress as much as possible the information content of the transmitted signal without undue degradation of the signal-to-noise ratio. Too much degradation reduces the chance of correctly interpreting, e.g. decoding, the received signal and too much redundancy does not efficiently utilize channel capacity. In the case where the transmitted data is speech information, speech rate reduction generally is accomplished by one of two approaches. One approach is "speech coding" which involves removing redundancy from the speech signal. The second approach is "digital speech interpolation" (DSI) which involves detecting and utilizing redundant or silent intervals during the speech conversation to transmit useful information. This invention is related to the earlier.

Differential coding is an efficient technique for encoding speech signals. In differential coding, a coder encodes and transmits, in digital form, the speech data over a data channel at a much lower bit rate than would otherwise be required if the entire speech data were transmitted. Thus with a given channel capacity, the speech data may be compressed for higher efficiency. The data channel may be constituted by electrical conductors or electromagnetic propagation media which contribute noise in the channel. The quality of the data signal at the receiver is measured by its signal-to-noise (S/N) ratio.

Generally, differential coders reduce successive speech data samples to a corresponding prediction error sample, such as the difference between two successive n-bit speech data samples, and then transmits only a prediction error sample for respective successive samples in the data stream. At the decoder, the prediction error samples are processed in a manner to reconstruct the full speech data samples which then have audible significance. In essense, only the difference between successive speech samples is transmitted and the redundancy is substantially reduced, but not eliminated entirely. Accordingly, there still is room for improvement.

Differential pulse code modulators (DPCM), adaptive differential pulse code modulators (ADPCM), and delta modulators (DM) typify various classes of differential coders. A delta modulator is a special type of DPCM. A background description of such coders can be found in articles entitled "Waveform Quantization and Coding", *IEEE Press Book* (1976) by N. S. Jayant; "Adaptive Prediction in Speech Differential Encoding Systems" by J. D. Gibson, *Proceedings of the IEEE*, Vol. 68, No. 4, (April 1980); and "Speech Coding" by J. L. Flanagan, et al *IEEE Transactions on Communications*, Vol. Com-27, No. 4 (April 1979).

Another technique for compressing the data content of a speech signal is known as "sample robbing" where a selected number of the data signals is periodically removed from the transmitted data stream. Such technique has been proposed by S. J. Campanella in his publication "Digital Interpolation Techniques", Proceedings of the 1978 *IEEE National Telecommunications Conference*, pp. 14.1.1–14.1.5, December 1978. Obviously, sample robbing somewhat degrades the S/N ration, but even moderate degradation may occasionally be tolerable during heavy traffic loading of the channel where the speech signal, when reconstructed at the receiving end of the channel, is still intelligible in an audible sense. The number of samples which may be robbed, however, is limited by aliasing errors introduced by the channel.

Another technique similar to sample robbing is known as "subsampling", such as that described by N. S. Jayant in the article "Subsampling of a DPCM Speech Channel to Provide Two Self-Contained Half Rate Channels", *Bell Systems Technical Journal*, 60[4], pp. 501–509 (April 1981). Subsampling, though, does normally take advantage of synchronizing the receiver and transmitter circuits and is subject to the same aliasing limitation mentioned above.

In a number of cases the requirement in speech transmission is intelligibility, and not a very high quality. For such requirements, the low bit-rate coders such as 16 to 24 kb/s DPCM (or ADPCM) coders are quite suitable. At these bit rates sample robbing can be used to reduce the bit rate requirement of the data transmission channel. For example, the performance of a 2-bit-word ADPCM (16 kb/s) with no sample robbing and a 3-bit-word ADPCM coder (24 kb/s) with 50% sample robbing is the same. Hence, if sample robbing is used, the effective bit rate is only 12 kb/s. This is equivalent to a 25% savings.

Further, the same performance could be achieved by using a 3-bit-word DPCM coder with 50% sample robbing. The DPCM coder is much simpler than the ADPCM coder.

Telecommunications (i.e., speech/data) traffic of a typical telephone network varies significantly during various times of the day. During peak hours, a number of calls are blocked due to nonavailability of lines. Sample robbing can be used to accommodate the additional traffic in which case a computer monitors the traffic conditions and decides what percentage of samples should be robbed from the channel to accommodate the additional traffic. When samples are robbed, there is some degradation on the speech quality. This degradation is proportional to the percentage of samples robbed.

Although differential coding and sample robbing each enables reduction of the required bit rate of transmission for a given speech signal, it is envisioned that further improvements in communication systems yet can be made in telecommunication systems employing DPCM and ADPCM coders since there remains some residual redundancy in the signal. To attain this improvement, sample robbing is additionally proposed. Sample robbing in a PCM system is straight forward, but in an DPCM or ADPCM where feedback is involved, complex problems such as prediction of the next sample, synchronization of the transmitter and receiver circuits, and replacement of the robbed sample are encountered. For this reason, present communication systems employing differential coders are not know to employ sample robbing.

SUMMARY OF THE INVENTION

In view of the above, it is a primary objective of the present invention to improve the signal-to-noise ratio, or alternatively, to provide bit rate reduction, in a digital communication system employing differential coding techniques.

Another objective of the present invention is to provide means for improving the performance of differential coders by introducing sample robbing, particularly differential pulse code modulators and adaptive differential pulse code modulators, by overcoming feedback interference introduced in such coders by sample robbing.

It is another objective of the present invention to provide means for gracefully degrading a digital signal temporarily, without loss of intelligibility, during heavy traffic loading on a data channel by providing dynamic sample robbing.

A further objective of the present invention is to provide means for handling data packet loss in packet-networks.

It is yet a further object of the present invention to provide means for improving the performance of a data transmission system transmitting digital data at a given bit rate.

To attain these and other objectives and advantages, the invention comprises a method and apparatus for combining differential coding and sample robbing techniques in a telecommunication network for the transmission of digital speech samples and/or digital data. At the transmitting end of the network, a series of data samples $s_i$ is supplied to and encoded by a differential coder while every 2nd, 3rd, 4th, etc. prediction error sample $3_i$ is not transmitted over, i.e. robbed from, the data channel. To overcome coding errors which otherwise would be introduced in the feedback path of the differential coder, an estimating circuit estimates, on the basis of historical samples, data samples which then replace the input data smaples so that the coding process may continue as usual. Autocorrelation statistics of the data samples are used in the estimation process. At the receiving end, the robbed prediction error samples $e_i$ are replaced by estimates derived from a similar estimation and a further re-estimation process while a reverse differential decoding algorithm is applied thereto for reconstructing the data samples $s_i$ originally supplied to the coder at the transmitter end. The re-estimation process employs delayed interpolation techniques. Means also are provided for synchronizing to operation of the transmitter and receiver ends.

The system is most useful for networks transmitting at bit rates of about 24 kb/s or lower since at these lower bit rates, the relatively larger quantizing noise introduced by the differential coder masks the interpolation noise introduced by sample robbing. Depending on channel noise and its bandpass characteristics, S/N improvement begins somewhere around 32 kb/s or lower for DPCM and ADPCM coders. Improvements in S/N ratio of up to 3 db gain in DPCM coders and of up to 1.5 db gain in ADPCM coders were realized by the present invention.

Other features, advantages, and aspects of the invention will become apparent upon reviewing of the succeeding description taken in connection with the accompanying drawings. The invention, though, is pointed out with particularity in the appended claims.

BRIEF DESCRIPTION OF THE DRAWINGS

FIGS. 2A and 2B are block diagrams of an exemplary model for constructing a communication system embodying an ADPCM coder which incorporates the principles of the present invention.

DESCRIPTION OF ILLUSTRATIVE EMBODIMENTS

As previously mentioned, at least one difficulty encountered in combining sample robbing techniques with differential coders is the introduction of sample errors in the feedback network cause by the omission of the robbed sample in the transmitted data stream. By the teachings of the present invention, this difficulty has been overcome by the use of sample estimators, which by virtue of their operation with the coding process, constitutes a novel aspect of the arrangement. In implementation, both transmitting and receiving ends of the system employ at least a three-word memory element, such as shift registers, to store previously decoded samples for use in the estimation process and to replace the robbed samples in the feedback network. Thus, the feedback loops transmitting and receiving ends continue processing the data sample with the estimated value of the previous samples stored the memory. When the next sample is received, the robbed sample is estimated again, and the old estimated value is discarded and replaced by the new estimated value. This essentially amounts to interpolation.

Various models of estimation and interpolation can be used. The third order estimator and the second order interpolator were found to give the best performance, except in the case where every second sample was robbed. In the case where every second sample was robbed, the second order estimator gave better results.

Figure 1A:
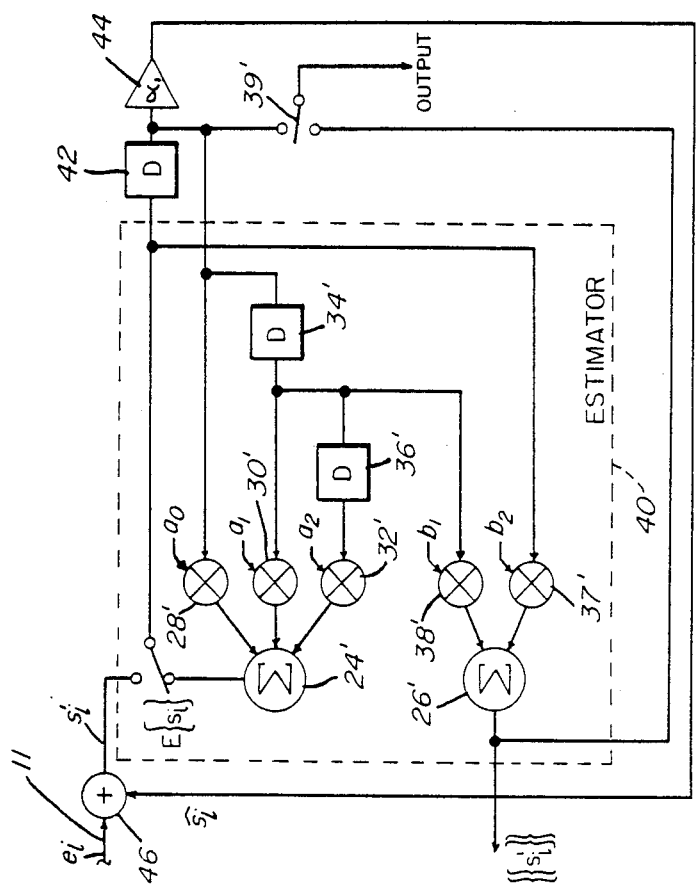
FIGS. 1A and 1B are block diagrams of an exemplary models for constructing a communication system embodying a DPCM coder which incorporates the principles of the present invention.
Figure 1B:
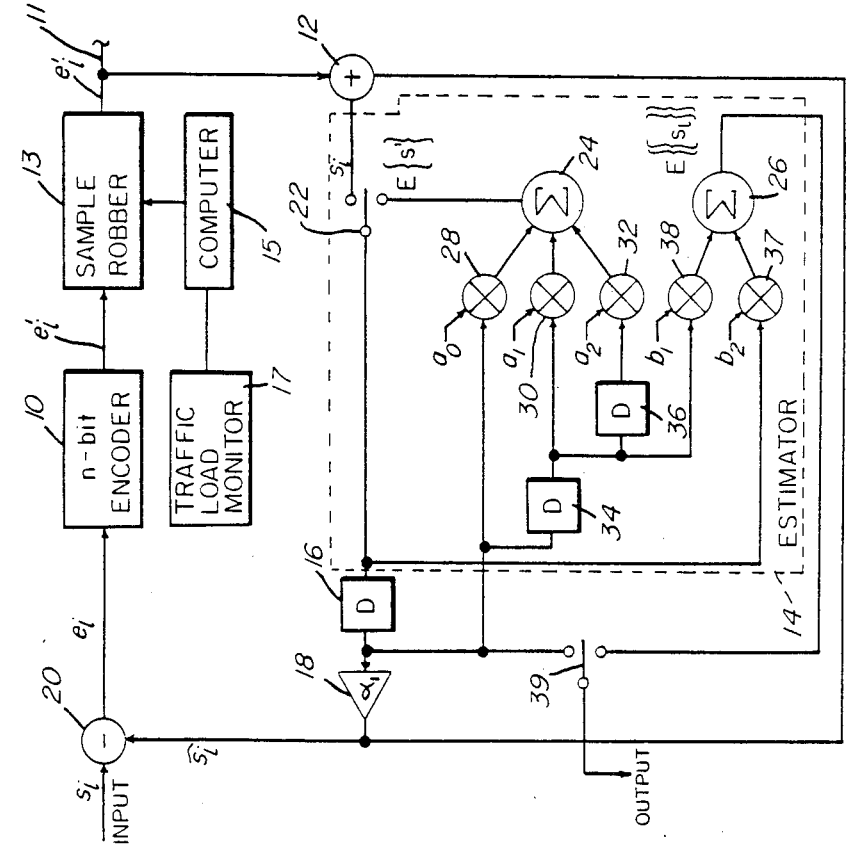

FIGS. 1A and 1B depict preferred models of a differential coder and decoder, respectively, located at the transmitting and receiving ends of telecommunication system embodying the teachings of this invention. At the transmitting end, data samples $s_i$, which may be speech data or other digital data, are transformed to a prediction error sample $e_i$ by an encoder 10 and a feedback network comprising adder 12, estimator 14, delay 16, amplifier 18, and substractor 20. The encoder is conventional, and may preferably be a uniform quantizer. Examples of encoders can be found in articles entitled "Differential Quantization of Communication Signals", U.S. Pat. No. 2,605,361, to Cutler; "Waveform Quantization and Coding", *IEEE Press Book* (1976) by N. S. Jayant; "Differential PCM for Speech and Data Signals", *IEEE Transactions of Communications*, 20, pp. 900-912 (1972) by J. B. O'Neal, Jr. and R. W. Stroh; and "Adaptive Quantization with a One-Word Memory", *Bell Systems Technical Journal*, pp. 1119-1145 (Sept. 1973) by N. S. Jayant. These references are incorporated herein.

At the receiving end of the system, the prediction error samples $e_i$ are decoded by a reverse procedure in a similarly arranged feedback network by estimator 40, delay 42, amplifier 44, and adder 46 thereby to reconstruct data sample $s_i$. Excluding the estimators 14 and 40, the system is a conventional differential coder and decoder of a telecommunications system. The notation "i" as used herein is a dummy variable designating the "ith" sample in a sequence or data stream. Each "ith" sample is an n-bit word, i.e. 12 binary bits of digital information.

Still referring to the system of FIGS. 1A and 1B, a series of 12-bit digital data, in this case speech data, enters the transmitter end at a subtractor 20. Subtractor 20 subtracts a predicted speech sample $\hat{s}_i$ from a current speech sample $s_i$ and generates therefrom the prediction error sample $e_i = (s_i - \hat{s}_i)$. s is a first order predictor, that is $\hat{s}_i = (\text{alpha}_i)(s_{i-1})$ where alpha is a prediction coefficient. Higher order predictors also can be used. The prediction error sample $e_i$ is then supplied to the encoder 10 where $e_i$ is encoded into an n-bit $e_i'$ for transmission over a data channel 11. The coder word length may vary. Normally, it is between two and five bits.

Assuming every third sample is robbed by a sample robber 13 from the channel 11, (although any number of periodic samples may be robbed), a switch 22 in the estimator 14 passes two out of every three data samples $s_i'$ from the adder 12 directly to the delay 16, and one out of three data samples from the summation circuit 24.

The sample robber 13 may comprise a transistor switch which is opened during robbed sample intervals and closed during transmitted sample intervals. The sample robbing periods, or open/close cycles of the switch, are controlled by a computer 15 which responds to traffic loads as monitored by a traffic load monitor 17.

The switch 22 which passes the sample $s_i'$ to the delay 16 is synchronized with the operation of the sample robber 13. The instant that a sample is robbed, i.e. switch in the sample robber 13 being opened, the switch 22 is connected to the summation circuit 24. Otherwise, the switch 22 connects to the adder 12. The synchronizing operation of the switch 22 and the sample robber 13 can be done by a computer.

Delay 16, as with other delays referred to herein, can be effected by processor-controlled memory elements or shift registers. After delay by the delay 16, the sample $s_i'$ is amplified by the amplifier 18 which produces the first order predicted value of the speech sample $\hat{s}_i$. This first order predicted sample forms the basis from which the next sample is encoded. Specifically, it is supplied to the adder 12 to generate the next $s_i'$ and to the subtractor 20 to generate the next $e_i$.

Every third sample of $e_i'$, however, is robbed (i.e. not transmitted), in which case the estimator 14 develops an estimated value of the sample $s_i$ so that the coding process may continue without being affected by the robbed sample. In this case, the switch 22 first couples the output of summation circuit 24 to the delay 16 to produce an estimate $E(s_i')$ from the previous history of the samples, and then replaces $E(s_i')$ with an interpolated, re-estimated sample $E((s_i'))$ after one additional period of delay.

In effect, the actual decoded value $s_i$ is first replaced by $E(s_i')$. During the next period, it is re-estimated using an interpolator to be $E(s_i')$. The re-estimated value is selected as the decoded value of previous period. This is accomplished by connecting the switch 39' to the summation circuit 26' exactly one period after the sample robbing and to delay 42 at all other times.

The estimated sample $E(s_i')$ is a second or third order estimator, of $s_i$, depending on the frequency of robbing performed by the sample robber circuit 13. Since a state objective of the invention is to provide dynamic sample robbing, a change in frequency of robbing by robbing circuit 13 entails a change in the order of the estimator used to derive the estimated sample $E(s_i')$. Dynamic robbing can be done by computer control of the same robber 13 in response to traffic loading sensed by the computer. For example, more samples are robbed with increasing traffic on the data channel.

For example, under normal traffic conditions the sample robbing is zero. Then the computer 15 will insure that the switch in the sample robber 13 is always closed, the switch 22 is always connected to the adder 12, and the switch 39 is always connected to the delay 42. If the traffic increases, the computer 15 will effect non-zero sample robbing and control the opening and closing of both the switch 22 and the switch in the sample robber 13. For robbing every 3rd sample, each of these switches will open once and close once during a three-period interval. For robbing every 2nd sample, the frequency of opening and closing will change to once every two periods. If the estimator model needs to be changed to accommodate the frequency of sample robbing, the computer will do that by changing the values of coefficients $a_0$, $a_1$ and $a_2$.

Another advantageous application of sample robbing is in packet-switching networks. If a speech-packet is lost in a packet-switched network, words and/or sentences will be clipped and conversation will be annoying. One way to avoid packet-loss is to transmit each packet via two traffic routes. Then the probability of losing a packet will be almost negligible. However, it doubles the data rate. Instead, two sets of coders and decoders could be used for each channel such that the first coder robs even numbered samples, while the second coder robs odd numbered samples. Then the two coded data streams are transmitted by two different routes. In this case, total data rate is the same as without robbing. If, at the receiver, both packets arrive, then the output sequence is formed by considering both decoder outputs and rejecting $E((s_i'))$ values. If one of the two packets is lost, the corresponding decoder output is rejected. This provides an effective means of handling packet-loss situation without increasing data rate.

A general equation used for calculating the estimated sample $E(s_i')$ is given by:

$$E(s_i') = a_1 s_{i-1}' + a_2 s_{i-2}' + \ldots + a_k s_{i-k}'$$

for k greater than or equal to 2 and where $a_1, a_2, \ldots, a_k$ are prediction coefficients. For a second order estimator, the equation reduces to:

$$E(s_i') = a_1 s_{i-1}' + a_2 s_{i-2}'$$

and for a third order estimator, the reduces to:

$$E(s_i')=a_1s_{i-1}'+a_2s_{i-2}'+a_3s_{i-3}'$$

A third order estimator is implemented in the coder and decoder circuits of FIGS. 1A and 1B. To generate $E(s_i')$ in the estimator 14, multipliers 28, 30, and 32, respectively, operate on samples $s_{i-1}'$, $s_{i-2}'$, and $s_{i-3}'$ from the outputs of delays 16, 34, and 36. The prediction coefficients $a_1$, $a_2$, and $a_3$ applied to the multipliers 28, 30 and 32 were determined by methods found in O'Neal and Stroh, "Differential PCM for Speech and Data Signals", *IEEE Transactions of Communications*, Vol. 20, pp. 900–912 (1972), incorporated herein.

Once $E(s_i')$ is obtained, it is re-estimated using the following general equation:

$$E((s_i'))=b_{i-n}s_{i-n}'+\ldots+b_{i-1}s_{i-1}'+b_{i+1}s_{i+1}'+\ldots+b_{i+m}s_{i+m}'$$

for intergers n, m each greater than or equal to 1, and wherein $b_{i-n}, \ldots, b_{i-1}, b_{i+1}, \ldots, b_{i+m}$ are interpolation coefficients derived by applying minimum mean square error criteria. In the perferred embodiment, the second order interpolator equation, where n and m equals "1":

$$E((s_i'))=b_1s_{i-1}'+b_2s_{i+1}'$$

was used for the re-estimated sample, or the higher order re-estimator equation:

$$E((s_i'))=b_0s_{i-2}'+b_1s_{i-1}'+b_2s_{i+1}'$$

can be used for determining the robbed samples. In the case of a third order re-estimator, the coefficients were determined by minimizing the mean square error $e^2$ in the robbed sample, that is, minimizing the equation:

$$e^2=[E((s_i'))-b_0s_{i-2}'-b_1s_{i-1}'-b_2s_{i+1}']^2$$

and in the case of the second interpolator, the following was minimized in order to calculated th coefficients:

$$e^2=[E((s_i'))-b_1s_{i-1}'-b_2s_{i+1}']^2$$

The expression for and value of the coefficients were determined and are given in the following Table No 1:

TABLE 1

The Estimator Coefficients to Estimate Robbed Samples

| | Coefficients | In Terms of $\alpha_1$, $\alpha_2$ and $\alpha_3$ | Value (Substituting $\alpha_1 = 0.866$, $\alpha_2 = 0.554$ and $\alpha_3 = 0.225$) (Ref. 3) |
|---|---|---|---|
| 2nd order equations (3) | $b_1$ | $(\alpha_1 - \alpha_1\alpha_2)/(1 - \alpha_2^2)$ | 0.5572 |
| | $b_2$ | $(\alpha_1 - \alpha_1\alpha_2)/(1 - \alpha_2^2)$ | 0.5572 |
| 3rd order equations (4) | $b_0$ | $\alpha_2 - \alpha_1 b_1 - \alpha_3 b_2$ | −0.3452 |
| | $b_1$ | $[\alpha_1 - \alpha_1\alpha_2 + (\alpha_1\alpha_3 - \alpha_2)b_2]/(1 - \alpha_1^2)$ | 0.9265 |
| | $b_2$ | $(\alpha_1 - \alpha_1\alpha_2 - \alpha_2\alpha_3 + \alpha_1^2\alpha_3 + \alpha_1\alpha_2^2 - \alpha_1^2)/(1 - \alpha_1^2 - \alpha_2^2 - \alpha_3^2 + 2\alpha_1\alpha_2\alpha_3)$ | 0.4303 |

The second interpolator is implemented in FIGS. 1A and 1B, although it is not required in the embodiment of FIG. 1A unless the decoded output is needed at the transmitting end. As shown, multiplier 37 operates on a next sample "i+1" from the adder 12 when switch 22 is switched thereto and multiplier 38 operates on a delayed sample "i−1" from the delay 34. As a result, an interpolated value of $s_i'$, e.g. $E((s_i'))$ emanates from the summing circuit 26 when the outputs of multipliers 37 and 38 and summed by the circuit 26. The output of the circuit 26 then replaces the estimated value of the speech sample $s_i'$ from the decoded output sequence by way of switch 39.

At the receiving end of the telecommunication system, a similar process is repeated, but in reverse order. FIG. 1B depicts the receiving circuit and the components of estimator 40 which are similarly labeled as with respect to estimator 14 of FIG. 1A, execpt that a superscript is appended to the reference numerals to indicate that they refer to the receiving end. In further explanation, the prediction error samples $e_i'$ enter the channel 11 and are supplied to the adder 46 where the error samples are combined with predicted values of the speech sample to reconstruct the originally transmitted data samples. However, instead of every third sample being robbed, an estimated sample is inserted between every two incoming prediction error samples in order to produce three speech samples $s_i'$ at the output of adder 46 for every two prediction error samples received.

As noted, part of the decoder components at the receiving end are identical to the encoder. This is necessary so that samples values used to predict the next sample, or estimate the robbed sample, are the same at both ends, assuming ideal channel conditions. In constructing the estimators circuit 14 and 40, the multiplier coefficient alpha was set at 0.875 (e.g. 162), rather than 0.866 which produces satisfactory results. Multiplication by 0.125 is the same as obtaining the result by a three-bit right shift. Hence, multiplying ($a_0, a_1, \ldots a_9, a_{10}, a_{11}$) by 0.875 is done by subtracting $(0, 0, 0, a_0, a_1, \ldots a_8)$ from $(a_0, a_1, \ldots a_8, a_9, a_{10}, a_{11})$. The circuit components of the estimators 14 and 40 can then be constructed of conventional adders, shift registers, and timing circuits, the actual circuit component configuration being well within the skill of a skilled artisan in view of the teachings of the present invention.

FIGS. 2A and 2B illustrate use of the invention with an adaptive differential pulse code modulator (ADPCM) and a telecommunication system. In FIGS. 2A and 2B, the estimators 50 and 60, respectively, correspond to the estimators circuits 14 and 40 of FIGS. 1A and 1B. The estimation and re-estimation processes are the same. As performed by the transmitter circuit of FIG. 1A, a data sample $s_i$ enters a subtractor 51 where it is combined with an estimated speech sample produced by an adaptive uniform quantizer constituted by an encoder 52 and a conventional step-size multiplier circuit 53 as described in the incorporated references relating to ADPCM systems. The multiplication factor provided by the step-size multiplier circuit 53 is determined by a step-size adapter circuit 54 which adjusts the quantizer step size upon transmission of the next signal as a function of the magnitude of the subsequent sample. The delay circuit 55 provides a one period delay after which signals are suppled to the multiplier circuit 53 for adjusting the quantizer step size. A typical adaptive differential pulse code modulator is described in the article "Adaptive Quantization with a one word memory", *Bell Systems Technical Journal*, pages 1,119–1,145 (Sept. 1973) by N. S. Jayant, incorporated herein.

The multiplication factor $M_i$ also is applied to a multiplier 56 which, in the feedback network of the transmitter encoding circuitry, is applied to the estimator circuit 50 for calculating the estimated and re-estimated values of the data samples as they pass through the estimator 50. The delay circuit 56 and the amplifier 57 function the same as the delay 16 and amplifier 18 of FIG. 1A.

On the receiving end as depicted in FIG. 2B, prediction error samples $e_i'$ are received at a multiplier 61. The prediction error samples are multiplied by a multiplication factor $M_i$ from the step-size adaptor circuit 62 after one period of delay through the delay circuit 63. Thereafter, the scaled prediction error sample $e_i'$ is supplied to the adder 64 whereupon the speech samples $s_i'$ are reconstructed by the estimation and re-estimation process by virtue of the estimator 60, delay 65 and amplifier 66. Again, the reconstruction of the speech sample $s_i'$ takes place in accordance with procedures described with respect to the process of FIGS. 1A and 1B.

Figure 3:
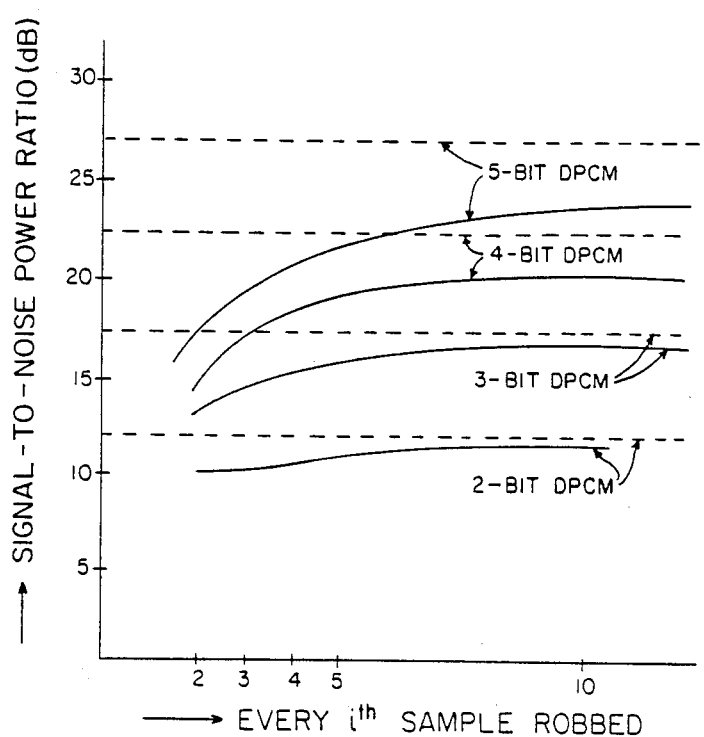
FIG. 3 graphically depicts the S/N power ratio as a function of the number of samples robbed for various word lengths in a DPCM coder of the exemplary model of FIG. 1.
Figure 4:
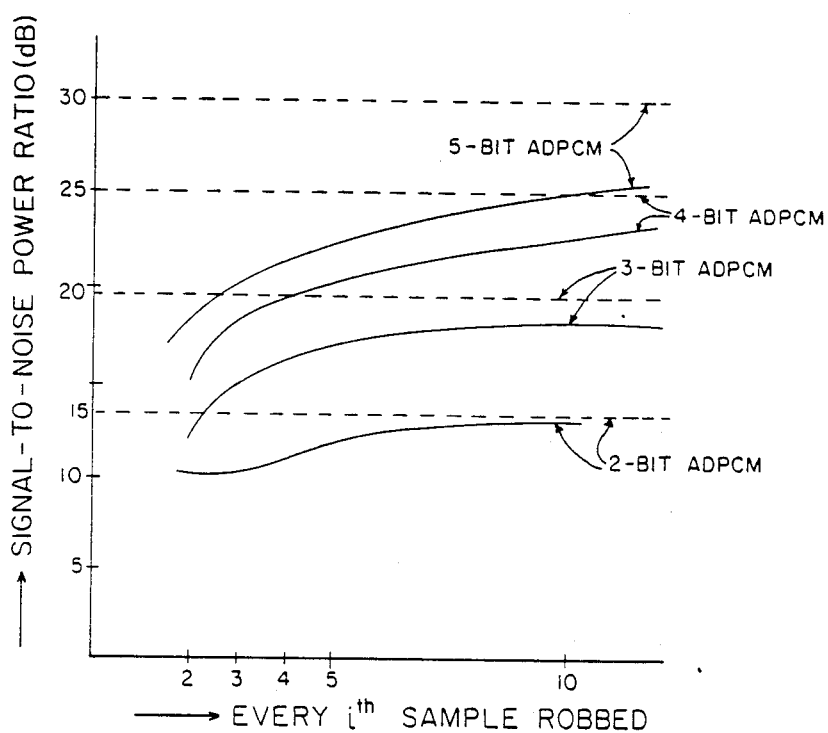
FIG. 4 graphically depicts the S/N power ratio as a function of the number of samples robbed for various word lengths in an ADPCM coder of the exemplary model of FIG. 2.

FIGS. 3 and 4 show the relationship between the signal-to-noise ratio and the value of the periodic sample robbed from the transmitted data stream. In FIG. 3, for example, it is seen that as fewer samples are robbed, the S/N ratio of a given n-bit DCPM sample approaches the S/N ratio when no samples are robbed at all. The difference between the "no sample robbing" (dashed lines) condition and the "sample robbed" condition (solid lines) represents the degradation in S/N ratio. When use in dynamic robbing, the number of samples robbed may be varied between limits defined by the largest S/N degradation permitted and between some arbitrary large periodic sample robbed, such as every 10th, for a given bit length in a DPCM system. Likewise, FIG. 4 illustrates the relationship between S/N ratio and the magnitude of the periodic sample robbed in an adaptive differential pulse code modulator system. It is seen that for an ADPCM system, somewhat better results can be attained.

Figure 5:
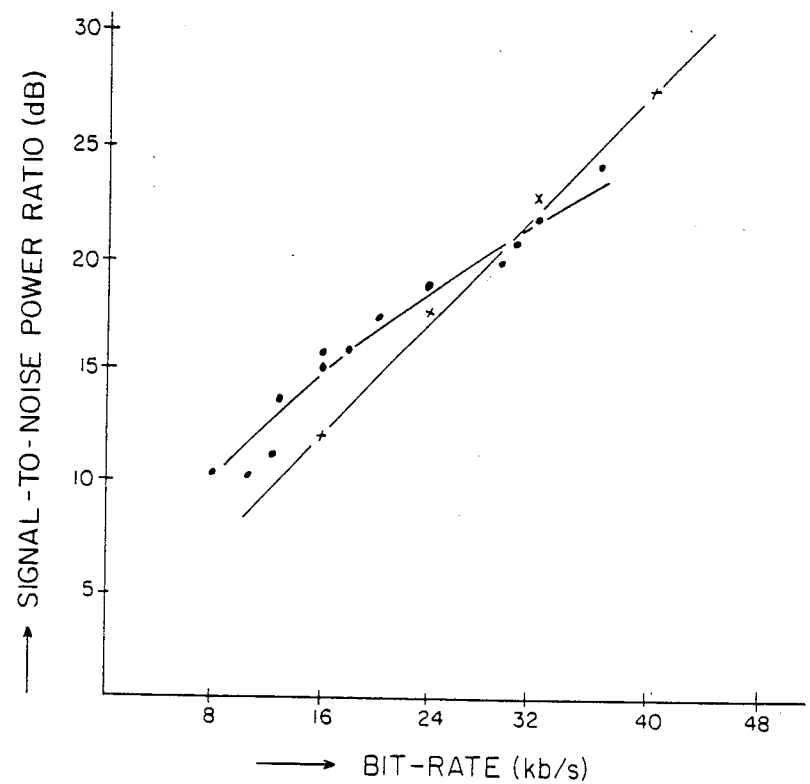
FIG. 5 graphically depicts the advantages in S/N improvement versus bit rate of the DPCM exemplary model of FIG. 1.
Figure 6:
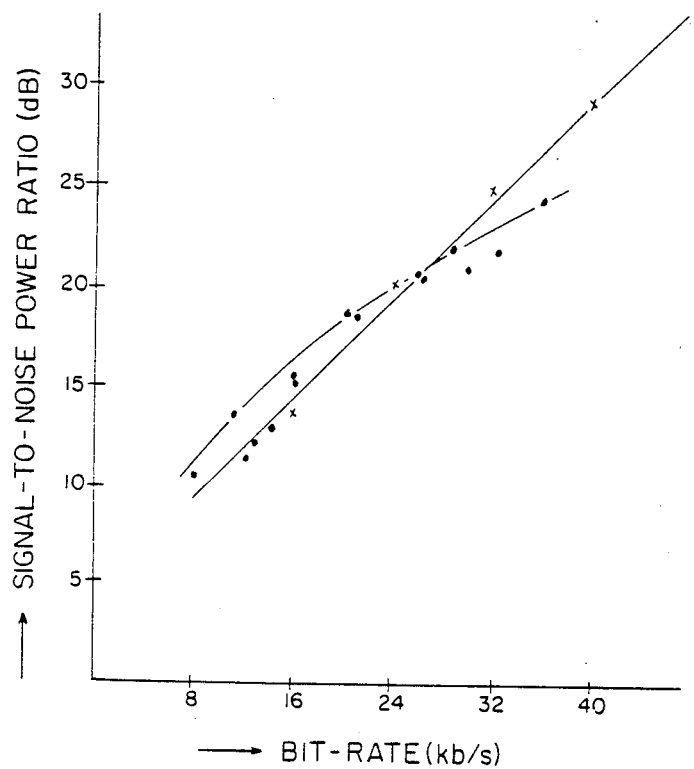
FIG. 6 graphically depicts the advantages in S/N improvement versus bit rate of the ADPCM exemplary model of FIG. 2.

FIGS. 5 and 6 show the relationship between S/N ratio and bit rate for DCPM and ADCPM systems. As evident from relationships depicted therein, improvements in the S/N ratio varies as a function of the bit rate of the telecommunication system. In FIG. 5 for example, it is seen that, at a crossover frequency above approximately 32 kb/s, no improvement is provided by combining sample robbing with a DPCM system, whereas below approximately 32 kb/s, improvement increases. Similarly, the crossover frequency for improvements in an ADPCM system begins somewhere below 24–26 kb/s.

In view of the foregoing, it is seen that significant improvement in a digital communication system can be attained by combining sample robbing with differential coding techniques. Several alterations or changes can be made to the illustrative embodiments without departing from the scope of the invention. Such illustration is not to be construed as a limitation. Instead, the true scope of the invention is defined by the appended claims.

What is claimed is:

1. A method for improving the signal-to-noise ratio in a digital communication system employing a differential coder using a feedback path at a transmitter thereof for producing, where i is an interger, prediction error samples $e_i$ from successive input data samples $s_i$ in an input data stream and employing digital interpolation at a receiver thereof to reconstruct data samples $s_i$ in an output data stream representative of the input samples $s_i$, said method comprising the steps of:

processing at the transmitter at least two successive n-bit input data samples $s_i$ supplied thereto for producing, from a corresponding prediction error sample $e_i$ being a linear function of at least one order of said successive n-bit input data samples, an encoded prediction error sample $e_i'$ for transmission over a data channel, periodically robbing from the data channel a number of encoded prediction error samples $e_i'$ and replacing in the feedback path of the differential coder each input data sample $s_i$ affected by said robbing by an estimated input sample $E(s_i')$, where $E(s_i')$ is a linear function of at least two orders of previously supplied input data samples $s_i'$, reconstructing said input data signals at the receiver by decoding successive prediction error samples $e_i'$ transmitted over said data channel, said decoding being performed by establishing a predicted received sample $\hat{s}_i$ on the basis of the autocorrelation function of at least one order of previously decoded samples $s_i'$, decoding each received data sample as $s_i' = e_i' + \hat{s}_i$ estimating the received data sample $E(s_i')$ as a function of at least two previously decoded data samples $s_i'$, after receiving at least one additional prediction error sample $e_{i+1}'$, ... and decoding at least one additional data sample $s_{i+1}'$, re-estimating the data sample $E(s_i')$ by delayed interpolation thereby to generate a re-estimated data sample $E((s_i'))$, and replacing the decoded data sample $s_i'$ in the output data stream with the re-estimated data sample $E((s_i'))$ thereby to reconstruct the transmitted input data signal $s_i$ with an improved signal-to-noise ratio in the communication system.

2. A method as recited in claim 1 further comprising the step of synchronizing the transmitter and receiver when transmitting and receiving prediction error sample $e_i'$ for incremental values of i.

3. A method as recited in claim 2 further comprising transmitting the predction error signal at a rate at or below an efficiency crossover frequency of approximately 24 to 32 kilobits per seconds.

4. A method as recited in claim 1 further comprising, in the estimating steps at both the receiver and transmitter, estimating the data sample $E(s_i')$ as $$E(s_i') + a_1 s_{i-1}' + a_2 s_{i-2}' + \ldots + a_k s_{i-k}'$$

for k greater than or equal to 2 and where $a_1, a_2, \ldots, a_k$ are prediction coefficients, and at the receiver, re-estimating the data sample $E((s_i'))$ as $$E((s_i')) = b_{i-n} s_{i-n}' + \ldots + b_{i-1} s_{i-1}' + b_{i+1} s_{i+1}' + \ldots + b_{i+m} s_{i+m}'$$

for integers n, m each being greater than or equal to 1, and wherein $b_{i-n}, \ldots, b_{i-1}, b_{i+1}, \ldots, b_{i+m}$ are interpolation coefficients obtained by applying a minimum mean square error criteria.

5. A method as recited in claim 3 further comprising, in the estimating steps at both the receiver and transmitter, estimating the data sample $E(s_i')$ as ps
$$E(s_i') = a_1 s_{i-1}' + a_2 s_{i-2}' + \ldots + a_k s_{i-k}'$$

for k greater than or equal to 2 and where $a_1, a_2, \ldots, a_k$ are prediction coefficients, and at the receiver, re-estimating the data sample $E((s_i'))$ as $$E((s_i'))=b_{i-n}s_{i-n}'+\ldots+b_{i-1}s_{i-1}'+b_{i+1}s_{i+1}'+\ldots+b_{i+m}s_{i+m}'$$

for integers n, m each being greater than or equal to 1, and wherein $b_{i-n}, \ldots, b_{i-1}, b_{i+1}, \ldots, b_{i+m}$ are interpolation coefficients obtained by applying a minimum mean square error criteria.

6. A method as recited in claim 1 further comprising, in the estimating steps at both the receiver and transmitter, estimating the data sample $E(s_i')$ as $$E(s_i')=a_1s_{i-1}'+a_2s_{i-2}'$$

where $a_1$ and $a_2$ are prediction coefficients, and
at the receiver, re-estimating the data sample $E((s_i'))$ as $$E((s_i'))=b_{i-2}s_{i-2}'+b_{i-1}s_{i-1}'+b_{i+1}s_{i+1}'$$

wherein $b_{i-2}, \ldots,$ and $b_{i-1}, b_{i+1}$, are interpolation coefficients from obtained by applying a minimum mean square error criteria.

7. A method as recited in claim 3 further comprising, in the estimating steps at both the receiver and transmitter, estimating the data sample $E(s_i')$ as $$E(s_i')=a_1s_{i-1}'+a_2s_{i-2}'$$

for k greater than or equal to 2 and where $a_1$ and $a_2$ are prediction coefficients, and
at the receiver, re-estimating the data sample $E((s_i'))$ as $$E((s_i'))=b_{i-2}s_{i-2}'+b_{i-1}+b_{i+1}s_{i+1}'$$

wherein $b_{i-2}, b_{i-1}$ and $b_{i+1}$ are interpolation coefficients obtained by applying a minimum mean square error criteria.

8. A method as recited in claim 1 further comprising, in the processing step, producing said encoded prediction error sample $e_i'$ by differential pulse code modulation (DPCM) techniques.

9. A method as recited in claim 1 further comprising, in the processing step, producing said encoded prediction error sample $e_i'$ by adaptive differential pulse code modulation (ADPCM) techniques.

10. A method as recited in claim 3 further comprising, in the processing step, producing said encoded prediction error sample $e_i'$ by differential pulse code modulation (DPCM) techniques.

11. A method as recited in claim 10 further comprising, in the robbing step, robbing a selected one of every second through tenth prediction error sample $e_i'$ transmitted over said data channel.

12. A method as recited in claim 3 further comprising, in the processing step, producing said encoded prediction error sample $e_i'$ by adaptive differential pulse code modulation (ADPCM) techniques.

13. A method as recited in claim 12 further comprising, in the robbing step, robbing a selected one of every second through tenth prediction error sample $e_i'$ transmitted over said data channel.

14. A method as recited in claim 4 further comprising, in the processing step, producing said encoded prediction error sample $e_i'$ by differential pulse code modulation (DPCM) techniques.

15. A method as recited in claim 4 further comprising, in the processing step, producing said encoded prediction error sample $e_i'$ by adaptive differential pulse code modulation (ADPCM) techniques.

16. A method as recited in claim 6 further comprising, in the processing step, producing said encoded prediction error sample $e_i'$ by differential pulse code modulation (DPCM) techniques.

17. A method as recited in claim 6 further comprising, in the processing step, producing said encoded prediction error sample $e_i'$ by adaptive differential pulse code modulation (ADPCM) techniques.

18. A method as recited in claim 7 further comprising, in the processing step, producing said encoded prediction error sample $e_i'$ by differential pulse code modulation (DPCM) techniques.

19. A method as recited in claim 18 further comprising, in the robbing step, robbing a selected one of every second through tenth prediction error sample $e_i'$ transmitted over said data channel.

20. A method as recited in claim 7 further comprising, in the processing step, producing said encoded prediction error sample $e_i'$ by adaptive differential pulse code modulation (ADPCM) techniques.

21. A method as recited in claim 20 further comprising, in the robbing step, robbing a selected one of every second through tenth prediction error sample $e_i'$ transmitted over said data channel.

22. An apparatus for improving the signal-to-noise ratio in a digital communication system employing a differential coder which utilizes a feedback path at a transmitter thereof for producing, where i is an integer, prediction error samples $e_i$ from successive input data samples $s_i$ in an input data stream and employing digital interpolation at a receiver thereof to reconstruct data samples $s_i'$ in an output data stream representative of the input samples $s_i$, said apparatus comprising:

means for processing at the transmitter at least two successive n-bit input data samples $s_i, s_{i-1}, \ldots$ supplied thereto thereby to produce, from a corresponding prediction error sample $e_i$ being a function of at least one order of said successive n-bit input data samples, an encoded prediction error sample $e_i'$ for transmission over a data channel.

means for periodically robbing from the data channel a number of encoded prediction error samples $e_i'$ and replacing in the feedback path of the differential coder each input data sample $s_i$ affected by said robbing by an estimated input sample $E(s_i')$, where $E(s_i')$ is a linear function of at least two order of previously supplied input data samples $s_i'$, means for reconstructing said input data signals at the receiver by decoding successive prediction error samples $e_i'$ transmitted over said data channel, and further including means for establishing a predicted received sample $\hat{s}_i$ on the basis of the autocorrelation function of at least one order of previously decoded samples $s_i'$, means for decoding each received data sample as $s_1'=e_i'+\hat{s}_i$ means for estimating the received data sample $E(s_i)$ as a function of at least two orders of previously decoded data samples $s_i'$, after receiving at least one additional prediction error sample $e_{i+1}', \ldots$ and decoding at least one additional data sample $s_{i+1}'$, means for re-estimating the data sample $E(s_i')$ by delayed interpolation thereby to generate a re-estimated data sample $E((s_i'))$, and means for replacing the decoded data sample $s_i'$ in the output data stream with the re-estimated data sample $E((s_i'))$ thereby to reconstruct the transmitted input data signal $s_i$ with an improved signal-to-noise ratio in the communication system.

* * * * *